US005516924A

United States Patent [19]

[11] Patent Number: 5,516,924
[45] Date of Patent: May 14, 1996 van de Sande et al.

[54] METHOD OF REFINING GLYCERIDE OILS

[75] Inventors: Robert L. van de Sande, Prinsenbeek; Jacobus C. Segers, Nieuwekerk a/d IJssel, both of Netherlands; Jannes G. Lammers, Retthorn Ganderkesee, Germany

[73] Assignee: Van den Bergh Foods Co., Division of Conopco, Inc., Lisle, Ill.

[21] Appl. No.: 368,249

[22] Filed: Jan. 3, 1995

Related U.S. Application Data

[63] Continuation of Ser. No. 150,509, Nov. 10, 1993, abandoned, which is a continuation of Ser. No. 22,801, Feb. 22, 1993, Pat. No. 5,286,886, which is a continuation of Ser. No. 368,694, Jun. 20, 1989, abandoned.

[30] Foreign Application Priority Data

Jun. 21, 1988 [GB] United Kingdom .................. 8814732

[51] Int. Cl.[6] .................................................. C09F 5/10

[52] U.S. Cl. .......................... 554/192; 554/193; 554/202

[58] Field of Search .................................... 554/192, 193, 554/202

[56] References Cited

U.S. PATENT DOCUMENTS

| | | | |
|---|---|---|---|
| 4,049,686 | 9/1977 | Ringers et al. | 260/424 |
| 4,113,752 | 9/1978 | Watanabe et al. | 260/424 |
| 4,154,750 | 5/1979 | Moore et al. | 260/424 |
| 4,155,924 | 5/1979 | Landis | 260/409 |
| 4,162,260 | 7/1979 | Segers | 260/424 |
| 4,240,972 | 12/1980 | Mag et al. | 260/424 |
| 4,276,227 | 6/1981 | Kirby | 260/425 |
| 4,414,157 | 11/1983 | Iwama et al. | 260/428.5 |
| 4,519,952 | 5/1985 | Cleary et al. | 260/419 |
| 4,533,501 | 8/1985 | Sen Gupta | 260/428 |
| 4,545,940 | 10/1985 | Mutoh et al. | 260/428 |
| 4,584,141 | 4/1986 | Paulitz et al. | 260/420 |
| 4,629,588 | 12/1986 | Welsh et al. | 260/428 |
| 4,698,185 | 10/1987 | Dijkstra et al. | 260/403 |

FOREIGN PATENT DOCUMENTS

| | | |
|---|---|---|
| 1189087 | 6/1985 | Canada . |
| 0077528 | 4/1983 | European Pat. Off. . |
| 0094252 | 11/1983 | European Pat. Off. . |
| 0182396 | 5/1986 | European Pat. Off. . |
| 0195991 | 10/1986 | European Pat. Off. . |
| 0269277 | 6/1988 | European Pat. Off. . |
| 1565569 | 4/1980 | United Kingdom . |
| 2162530 | 2/1986 | United Kingdom . |

*Primary Examiner*—Paul J. Killos
*Attorney, Agent, or Firm*—Rimma Mitelman

[57] ABSTRACT

The invention relates to a method of refining glyceride oil comprising the step of degumming said glyceride oil, wherein said degumming step is followed by a separation step in which undissolved and non-centrifugable particles are removed from said degummed oil. Preferably said degumming step is followed by a step of holding the degummed oil for such a period of time and under such temperature conditions as to cause agglomeration of said undissolved particles, and for an agent promoting the formation of undissolved particles and/or promoting the agglomeration of the undissolved particles is added to the oil.

5 Claims, No Drawings

METHOD OF REFINING GLYCERIDE OILS

This is a continuation application of Ser. No. 08/150,509, filed Nov. 10, 1993, (now abandoned) which is a continuation of Ser. No. 08/022,801, filed Feb. 22, 1993, (now issued U.S. Pat. No. 5,286,886) which is a continuation of Ser. No. 07/368,694, filed Jun. 20, 1989, (now abandoned).

The present invention relates to a method of refining glyceride oils, and in particular to such a method of refining comprising a degumming step.

Glyceride oils of in particular vegetable origin, such as soybean oil, rapeseed oil, sunflower oil, safflower oil, cotton seed oil and the like, are a valuable raw material for the food industries. These oils in crude form are usually obtained from seeds and beans by pressing and/or solvent extraction.

Such crude glyceride oils mainly consist of tri-glyceride components. However, they generally also contain a significant amount of non-triglyceride components including phosphatides (gums), waxy substances, partial glycerides, free fatty acids, colouring materials and small amounts of metals. Depending on the intended use of the oil, many of these impurities have an undesirable effect on the (storage) stability, taste, and colour of later products. It is therefore necessary to refine, i.e. to remove the gums and other impurities from the crude glyceride oils as much as possible.

In general the first step in the refining of glyceride oils is the so-called degumming step, i.e. the removal of the phosphatides. In this context the term "degumming" relates to any treatment of the oil eventually, for instance after conditioning of the oil, resulting in the removal of gums and associated components. In conventional degumming processes water is added to the crude glyceride oil to hydrate the phosphatides, which are subsequently removed e.g. by centrifugal separation. Since the resulting degummed oil often still contains unacceptably high levels of "non-hydratable" phosphatides, this water-degumming step is normally followed by chemical treatments with acid and alkali to remove the residual phosphatides and to neutralize the free fatty acids ("alkali-refining").

Subsequently, the soapstock so formed is separated from the neutralized oil by centrifugal separation. The resulting oil is then further refined using bleaching and deodorizing treatments.

After the above described water-degumming step in general residual phosphorus levels are achieved in the order of 100–250 ppm. By the improved degumming method as described in U.S. Pat. No. 4,049,686 in which the crude or water-degummed oil is treated with a concentrated acid such as in particular citric acid, residual phosphorus levels can be brought down to within the range of from 20–50 ppm. This degumming method is referred to hereafter as a super-degumming method.

In general, the lower the amount of residual phosphatides after the degumming step the better or easier the subsequent refining steps. In particular, a low phosphatide level after degumming results in easier processing in the alkali-refining step or even may open the possibility to omit the alkali-refining step altogether, in which case the oil is only further refined by means of bleaching and steam-refining. A refining process sequence which does not involve an alkali treatment and subsequent removal of soapstock is often referred to as "physical refining", and is highly desirable in terms of avoiding pollution, processing simplicity, and yield.

It has now been found that although the conventionally degummed oil may visually appear 'crystal' clear, there is still present a certain proportion of residual, undissolved particles, such as hydrated phosphatides that cannot be removed by a straightforward centrifugation, and these particles may be removed by a direct microfiltration or by any suitable separation technique after subjecting the degummed oil to conditions promoting the agglomeration and/or the additional formation of undissolved gum containing particles, such as allowing an appropriate hold-up time at an appropriate temperature adding agglomeration promoting agents, such as alkali, acid, hydrolyzed phosphatides, water and mixtures thereof. In case of residual phosphatides, residual phosphorus levels below 15 ppm or even below 10 or 5 ppm are attainable. A very convenient method of separating off this proportion of undissolved phosphatides, suitable to be applied on a technical scale, has been found to be filtration over a microfilter of suitable pore size and porosity.

Accordingly, in its broadest aspect the present invention provides a method of refining glyceride oil comprising the step of degumming said glyceride oil characterized in that said degumming step is followed by a separation step in which undissolved and originally non-centrifugable particles are removed from said degummed oil.

Essential in the present refining method is that the glyceride oil is first degummed. This may be effected by any conventional degumming method which involves hydration of the phosphatides, and suitable to reduce the level of residual phosphorus to within the range of from 5–250 ppm by weight of the oil.

For the purposes of the present invention the term "degumming" relates to any method of treating glyceride oils which involves the addition of water to said oil, whether alone or in addition or subsequent to or preceding chemicals such as acid and/or alkaline substances, and whether for the sole purpose of degumming or also for further purposes, so as to render at least part of the non-glyceride components such as in particular the phosphatides, insoluble in said oil due to hydration, and subsequently separating off said insoluble hydrated material by centrifuge or filtration to a level of from 5–250 ppm, residual phosphorus. Suitable degumming methods are for instance disclosed in GB-A-1, 565,569; U.S. Pat. Nos. 4,240,972; 4,276,227; EP-A-0,195, 991.

In its simplest form the degumming step involves the addition of a relatively small amount of water to the crude glyceride oil, particularly from 0.2 to 5%, preferably from 0.5 to 3% by weight of the oil, followed by separating off the phosphatide containing sludge by centrifuge. This so-called water-degumming is well known in the art and descriptions of suitable processing conditions can be found in many textbooks.

Preferably the super-degumming method is applied as described in U.S. Pat. No. 4,049,686 which comprises dispersing an effective amount of a concentrated acid or acid anhydride in the crude or optionally water-degummed oil, and subsequently dispersing an appropriate amount of water into the acid-treated oil. The aqueous sludge is separated off after the oil, acid and water mixture has been maintained for at least 5 minutes at a temperature below 40° C.

To achieve residual phosphorus levels of 20–50 ppm the crude oil is preferably treated with a concentrated solution of citric acid at 70°–90° C. during 10–20 minutes. Subsequently, water is added in an amount of 0.2 to 5%, preferably 0.5 to 3% by weight of the oil. The mixture is cooled down either before or after addition of the water to a temperature of below 40° C., preferably below 25° C. So as to allow optimal hydration of the hydratable phosphatides the oil, acid and water mixture is kept at this temperature during a period of preferably more than 1 hour, more preferably 2–4 hours.

Depending upon the level of non-hydratable phosphatides it may be of advantage to further add extra hydratable phosphatides according to the method as described in U.S. Pat. No. 4,162,260. Also the addition of hydrolyzed phosphatides as described in U.S. Pat. No. 4,584,141 may be of advantage. Subsequently, the phosphatide-containing sludge is separated from the oil by way of a centrifugal separator. It is preferred to heat the mixture to a temperature of 50° to 80° C. immediately before the separation step.

Subsequent to the degumming step (including the sludge separation step) the degummed oil is further treated to remove the remaining proportion of undissolved phosphatides present as very small particles having a critical separation diameter of below about 0,05–10 microns, depending on the separation technique and separation conditions used.

In particular, a suitable and preferred method for such removal has been found filtrating the degummed oil over a microfilter of suitable pore size.

Accordingly, in a particular aspect of the present invention there is provided a method of refining glyceride oil comprising the step of degumming said oil characterized in that said degumming step is followed by the step of filtrating the degummed oil over a microfilter having an average pore size suitable to reduce the residual phosphorus level to below 15 ppm by weight of the oil.

To achieve a reduction of the residual phosphorus to a level of below 15 ppm in accordance with the present invention the average pore size of the filter should be below about 5 microns. Further and preferred reductions to below 10 or even below 5 ppm residual phosphorus can be achieved by using microfilter pore sizes of below 0.5 microns and most preferably within the range of from 0.1 to 0.3 microns.

The agglomeration may be initiated and/or increased by subjecting the degummed oil to conditions initiating the formation of the particulate material (gums) that is not dissolved in the oil and/or promoting the agglomeration of the undissolved particles, such as holding time, lowering temperature, by adding agents initiating the formation of the particulate material and/or promoting the agglomeration of the undissolved particles, such as alkali (lye, caustic soda, sodium silicate, calcium carbonate and the like), acid (phosphoric acid, citric acid, tartaric acid and the like), hydratable phosphatides (U.S. Pat. No. 4,162,260), hydrolyzed phosphatides (U.S. Pat. No. 4,584,141). With respect to alkali an appropriate amount of alkali, the amount of alkali added is equivalent to about 0.01 to 100% of free fatty acids present in the degummed oil. Preferably the amount of alkali added is equivalent to about 0.05 to 50% of free fatty acids present in the degummed oil. Due to the addition of these agents at similar agglomeration times, the agglomeration temperature may be chosen, if desired, at a higher temperature or at a specific agglomeration temperature the agglomeration time may be shortened.

Optionally the separation step may include the addition of an absorbent or adsorbent for the undissolved particles to be removed. Examples of adsorbents are bleaching earth, activated coal comprising materials, cellulose materials, such as Arbocel (registered trade mark). Examples of absorbents are microporous silicas and alumina silicas, such as Trisyl (registered trade mark).

Under conditions very favourable for the agglomerating process instead of or in addition to the microfiltration step also a second centriugal separation step or any other separation method suitable for removing the undissolved particulate material from the oil may be used.

Super-degumming is preferably used, because the agglomeration time period is remarkably reduced, and higher agglomeration temperatures may be used. Most preferred, the agglomeration step is performed at the same temperature as used in the super-degumming treatment.

The use of acid as an agent initiating and/or promoting the particle formation and particle agglomeration advantageously prevents the soap formation.

The undissolved particles or agglomerates may be removed by microfiltration, filtration, centrifugation, sedimentation and decantation. After the removal of the particles the refining of the oil, for instance having a residual phosphorus level below 15 ppm, preferably below 10 ppm, or even below 5 or 2 ppm, may be continued by any refining method suitable to achieve the desired specification of the refined oil. Such further refining methods include alkali refining, bleaching and deodorisation. In particular, and preferably the refining method in accordance with the present invention is physical refining, in which case the refining method comprises the steps of degumming, reducing the residual-phosphorus level to below 15 ppm, bleaching and deodorisation, but does not include an alkali-refining step. It is even possible that the bleaching step is omitted.

The very low residual phosphorus levels of below 10 ppm or even 5 ppm as achieved by the process of the present invention have an advantageous effect upon the consumption of bleaching agent in the bleaching step, thereby contributing significantly to the economy of the refining process and reducing the environmental difficulties attached to excessive consumption of bleaching agents.

The present invention is now further illustrated by way of the following examples.

EXAMPLE 1

Crude maizegerm oil was degummed by the following procedure:

(1) admixing the crude oil with 0.07% citric acid monohydrate (as a 50% solution) at 85° C.;

(2) after 20 minutes admixing 1.6% of water;

(3) cooling the mixture down to 25° C. and allowing hydration for 3 hours; and (4) separating the sludge from the oil at 65° C. over a centrifugal separator.

Subsequently, the resulting degummed oil was microfiltrated using five Milipore (registered trademark) filters having pore sizes ranging from 1.20 to 0.22 microns. The results were as follows:

| | residual P in ppm |
|---|---|
| after degumming, unfiltered | 21.6 |
| filtered over 1.20 microns | 15.2 |
| filtered over 0.80 microns | 16.6 |
| filtered over 0.65 microns | 14.3 |
| filtered over 0.45 microns | 8.9 |
| filtered over 0.22 microns | 6.7 |

EXAMPLE 2

Crude rapeseed oil was degummed by the following procedure:

(1) admixing the crude oil with 2% of hydrolysed lecithin and 0.12% citric acid monohydrate (as a 50% solution) at 65° C.;

(2) after 20 minutes admixing 1.7 % of water;

(3) cooling the mixture down to 40° C. and allowing hydration for 3 hours; and (4) separating the sludge from the oil at 65° C. over a centrifugal separator.

Subsequently, the resulting degummed oil was microfiltrated using five Milipore (registered trademark) filters having pore sizes ranging from 1.20 to 0.22 microns. The average results of 5 tests were as follows:

| | residual P in ppm |
|---|---|
| after degumming, unfiltered | 20 |
| filtered over 1.20 microns | 10 |
| filtered over 0.80 microns | 7 |
| filtered over 0.65 microns | 8 |
| filtered over 0.45 microns | 5 |
| filtered over 0.22 microns | 4 |

For reasons of comparison the same filtration tests were carried out with a non-degummed rapeseed oil and a similarly degummed, but subsequently dried rapeseed oil (i.e. comprising residual phosphatides in unhydrated form only). The results were as follows:

| | residual P in ppm | |
|---|---|---|
| | non-degummed | degummed and dried |
| unfiltered | 410 | 18 |
| filtered over 1.20 microns | 430 | 18 |
| filtered over 0.65 microns | 410 | 17 |
| filtered over 0.22 microns | 420 | 17 |

These comparisons clearly show that the microfiltration step in accordance with the present invention is suitably applied only to degummed oils containing residual particles, e.g. phosphatides. Re-addition of water resulted in the reformation of the undissolved particles removable by microfiltration as shown in the first 5 microfiltration tests.

EXAMPLE 3

Crude rape seed oil was degummed according to the super-degumming procedure used in example 2. The super-degummed rape seed oil obtained contained 12 ppm P.

Samples of the super-degummed rape seed oil were subjected to different agglomeration treatments, of which the holding time and holding temperatures are indicated in table I. After the agglomeration treatments, the samples were microfiltrated using microfilters having a pore size of 3.0, 1.2 and 0.45 μm, respectively. The residual phosphorus levels of the microfiltrated and super-degummed oils are also indicated in table I.

TABLE I

| Holding time | Holding temperature | Residual phosphorus level (ppm) after microfiltration through | | |
|---|---|---|---|---|
| (min) | (°C.) | 3.0 μm | 1.2 μm | 0.45 μm |
| 15 | 25 | 2 | 2 | <2 |
| 35 | 25 | 2 | 2 | <2 |
| 95 | 25 | <2 | <2 | <2 |
| 15 | 65 | 6 | 5 | 2 |
| 35 | 65 | 5 | 5 | 3 |
| 95 | 65 | 5 | 5 | 3 |
| 15 | 90 | 5 | 7 | 3 |
| 35 | 90 | 5 | 7 | 4 |
| 95 | 90 | 10 | 11 | 4 |

This table I shows that the undissolved particles agglomerated to an agglomerate size of more than 3 μm within a holding time of about 1.5 hour at relatively low holding temperatures. A particle size of about 3.0 μm makes the removal of the agglomerates by centrifugation feasible.

EXAMPLE 4

Conventionally water-degummed bean oil (phosphorus level 140 ppm) was (micro)filtrated two weeks after storage at ambient temperature.

The residual phosphorus levels obtained by filtration after water-degumming and cooling, and after a two weeks holding time at ambient temperature are listed in table II.

Table II shows that after a relatively long holding time at ambient temperature, the hydrated, non centrifugable particles form stable agglomerates having an agglomerate size larger than 1.2 μm. These agglomerates are removable from the oil using microfiltration.

TABLE II

| Filter pore | Filtration | |
|---|---|---|
| size (μm) | directly | after two weeks |
| 8.0 | 122 | 119 |
| 3.0 | 136 | 126 |
| 1.2 | 122 | 25 |
| 0.45 | 128 | 24 |

EXAMPLE 5

Crude bean oil was super-degummed following the procedure of example 2. The super-degummed bean oil had a phosphorus level of 12 ppm.

Samples of this super-degummed bean oil were subjected to various agglomeration treatments, and subsequently centrifugated during 10 min. at 1,000 rpm (corresponding to a critical centrifugational diameter of 17 μm) and 4,000 rpm (corresponding to a critical centrifugational diameter of 4.3 μm).

The results are summarized in table III.

TABLE III

| Agglomeration time (min.) | Residual P (ppm) after centrifugation at | |
|---|---|---|
| at 25° C. | 1,000 rpm | 4,000 rpm |
| 0 | 5.9 | 3.4 |
| 30 | 4.5 | 5.4 |
| 75 | 3.1 | 2.3 |
| 120 | — | 2.2 |

Table III shows that the residual phosphorus level may be lowered using a combination of prolonged agglomeration times and higher centrifugation speeds.

EXAMPLE 6

Crude sunflower oil was super-degummed and dewaxed by the following procedure:

1) admixing the crude sunflower oil with 1% of hydrolysed lecithin and 0.08% citric acid mono-hydrate (as a 50% solution) at 65° C.;

2) after 10 min. cooling to about 18° C. and admixing 1.75% of water;

3) allowing hydratation and crystallization for 3 hours; and 4) separating the sludge from the oil at 28° C. using a centrifugal separator.

Subsequently, the super-degummed and dewaxed sunflower oil was microfiltrated after 30 min. agglomeration time, at 25° C. using a microfilter having a pore size of 0.2 μm (Microza filter obtained from Asahi). The residual phosphorus level was lowered to about 2 ppm (starting phosphorus level 60 ppm).

The permeate obtained was directly subjected to a deodorization step (2 hours at 240° C.) omitting any bleaching treatment.

The organoleptic properties and storage properties of the refined sunflower oil were compared to conventionally alkali refined and physically refined sunflower oil obtained from the same lot.

The results are summarized in table IV.

TABLE IV

| Property | Alkaline refined | Physically refined | Invention |
|---|---|---|---|
| ffa (%) | 0.01 | 0.01 | 0.02 |
| P-level (ppm) | <1 | <1 | <1 |
| Fe-level (ppm) | 0.03 | 0.02 | 0.08 |
| Taste index 0 weeks | 6.6 | 6.4 | 6.6 |
| Taste index 3 weeks | 6.3 | 5.8 | 6.3 |
| Taste index 6 weeks | 6.2 | 5.8 | 5.6 |
| Taste index 9 weeks | 6.2 | 6.0 | 5.7 |

EXAMPLE 7

Crude rape seed oil was super-degummed following the procedure of example 2. Subsequently, sodium hydroxide was added in amounts equivalent to about 15% or 25% of the free fatty acids (ffa) present in the oil (corresponding to 0.19% and 0.32% ffa, respectively). The sodium hydroxide was intensively admixed with the super-degummed rape seed oil.

After a holding time period of 3–4 hours oil samples were filtrated using filters having a pore size of 8, 1.2 and 0.4 μm, respectively.

The results of two independent experiments are summarized in table V.

TABLE V

| Alkali | residual P (ppm) after 3–4 hr holding | | | |
|---|---|---|---|---|
| addition | nf | 8 μm | 1.2 μm | 0.4 μm |
| no alkali | 7–9 | 4.3–6.0 | 3.5–5.5 | 2.1–3.3 |
| addition alkali: | | | | |
| equiv. 15% ffa | 8 | 2.7 | 2.1 | 0.4 |
| equiv. 25% ffa | 10 | 5.2 | 3.9 | — |

EXAMPLE 8

Crude rape seed oil was super-degummed using a super-degumming procedure similar to the procedure disclosed in example 2. After an optional addition of alkali and a holding time period of 3–4 hours at ambient temperature (less than 30° C.) the separation step was carried out using a continuous pilote scale clarifier (westfalia SAOOH 205) at a conventional back pressure and at varying throughputs. The experimental results obtained are reviewed in table VI.

TABLE VI

| Exp. no. | Clarifying conditions for super-degummed rape seed oil (sdg-RP)[1] Throughput (l/h) | Amount alkali added (% of ffa) | Residual P (ppm) | ffa (%) | Fe (ppm) | Ca/Mg/Na (ppm) |
|---|---|---|---|---|---|---|
| I | starting sdg-RP | 0 | 7.0 | | | |
| | 5 | 0 | 4.0 | | | |
| | 13 | 0 | 4.4 | | | |
| | 25 | 0 | 4.9 | | | |
| | 30 | 0 | 4.2 | | | |
| II | starting sdg-RP[2] | 15 | 7.7 | 0.88 | 0.1 | 1.3/0.6/140 |
| | 7 | 15 | 1.0 | 0.81 | <0.1 | 0.3/0.1/4.3 |
| | 17 | 15 | 1.9 | 0.83 | <0.1 | 0.2/0.1/7.9 |
| | 63 | 15 | 0.7 | 0.83 | <0.1 | 0.3/0.3/9.3 |
| III | starting sdg-RP[2] | 25 | 10.3 | — | — | —/—/— |
| | 23 | 25 | 0.7 | 0.78 | 0.4 | 1.3/0.4/16 |
| | 40 | 25 | 2.0 | 0.78 | 0.4 | 1.0/2.2/13 |
| | 105 | 25 | 1.4 | 0.80 | 0.3 | 0.9/0.2/6.5 |
| | 125 | 25 | 1.2 | 0.75 | 1.0 | 0.9/0.2/33 |

Note 1, super-degumming conditions: incoming oil temperature 80–85° C.; P content incoming oil 1000–1100 ppm comprising 2.2% hydrolyzed lecithin; citric acid monohydrate dosing 0.12%; water dosing 2.2%; hydration time 3 hours; separation temperature 65° C.
Note 2: the increase in the starting residual phosphorus level in the later experiments II and III resulted from a contamination of the clarifier.

Table VI clearly shows that residual, undissolved and initially non-centrifugable particles, such as phosphatides, can be effectively removed by centrifugal separation at relatively high throughputs using the separation step according to the invention and the optional alkali addition.

EXPERIMENT 9

Crude rape seed oil was super-degummed using the procedure similar to that disclosed in experiment III of example 8. The undissolved now agglomerated particles were removed using a micro-filtration module (Micorza filter module of Asahi, filter surface area 0.2 $m^2$).

The results are shown in table VII

TABLE VII

| oil characteristic | before microfiltration | after microfiltration |
|---|---|---|
| residual P (ppm) | 16.4 | 2.0 |
| ffa (%) | 0.92 | 0.76 |
| Ca/Mg (ppm) | 5.3/1.5 | 0.5/0.2 |
| Fe (ppm) | 1.3 | 0.2 |
| Na (ppm) | 610 | 0.9 |

We claim:

1. A method of refining glyceride oil comprising the steps of:

(a) using a degummed glyceride oil;

(b) holding the degummed oil, without subjecting the oil to treatment with acid or alkali, for a time period at a temperature between ambient temperature and 40° C. such as to cause agglomeration of undissolved particles; and (c) removing the particulate material formed.

2. A method as claimed in claim 1, wherein said particles are removed by microfiltration.

3. A method as claimed in claim 1, wherein the undissolved particles are agglomerated at an oil temperature between ambient temperature and 40° C. for a time period of about 0.5–5 hours.

4. A method as claimed in claim 1, wherein the separation step comprises the addition of an adsorbent and/or absorbent for the undissolved particles to be removed.

5. A method as claimed in claim 1, wherein said particles are removed by filtration, microfiltration, centrifugation, sedimentation and/or decantation.

* * * * *